United States Patent [19]

Leiber et al.

[11] Patent Number: 4,904,028

[45] Date of Patent: Feb. 27, 1990

[54] BRAKE PRESSURE SETTING DEVICE

[75] Inventors: Heinz Leiber, Oberriexingen; Manfred Steiner, Stuttgart, both of Fed. Rep. of Germany

[73] Assignee: Daimler-Benz AG, Stuttgart, Fed. Rep. of Germany

[21] Appl. No.: 339,122

[22] Filed: Apr. 17, 1989

[30] Foreign Application Priority Data

Apr. 16, 1988 [DE] Fed. Rep. of Germany ....... 3812831

[51] Int. Cl.$^4$ .......................... B60T 8/32; B60T 8/40; B60T 13/10; G05D 13/00
[52] U.S. Cl. .................................. 303/110; 303/100; 303/119; 303/115; 180/197
[58] Field of Search ............... 303/110, 113, 111, 114, 303/115, 116, 117, 93, 118, 119, 100, 92, 96; 188/151 A, 181; 180/197, 233, 244–248

[56] References Cited

U.S. PATENT DOCUMENTS

| | | | |
|---|---|---|---|
| 4,815,792 | 3/1989 | Tröster | 303/110 X |
| 4,824,185 | 4/1989 | Leiber et al. | 303/110 |
| 4,836,617 | 6/1989 | Resch | 303/100 |

Primary Examiner—Douglas C. Butler
Attorney, Agent, or Firm—Barnes & Thornburg

[57] ABSTRACT

In a brake pressure setting device suitable for both an antilocking control system and a drive slip control system, a pressure modulator unit designed as a stepped cylinder is provided with a modulation chamber which can be connected to the main brake pipe of the brake circuit of the driven vehicle wheels and a control pressure space separated from the modulation chamber by the modulator piston. The control pressure space can be connected to a pressure outlet of an auxiliary pressure source or alternatively to its non-pressurized sump tank. The modulator piston is urged by a return spring into a position corresponding to maximum volume of the modulation chamber. Connecting the control pressure space to the pressure outlet of auxiliary pressure source moves the piston into an end position corresponding to a minimum volume of the modulation chamber. Controllable piston displacements can, with the interaction of the brake pressure control valves of the antilocking system, control brake pressure reduction and brake pressure build-up phases of antilocking and drive slip control in any given order. The modulator piston is continuously held in an intermediate position, from which the control can take place in the particular control direction necessary. A position indicator is provided for monitoring the initial position of the modulator piston. In addition, a mechanically controlled valve is provided which, after the modulator piston has executed a small fraction of its stroke in the direction which reduces the volume of the modulation chamber, moves into its functional position shutting off the modulation chamber from the outlet pressure space of the brake unit.

20 Claims, 1 Drawing Sheet

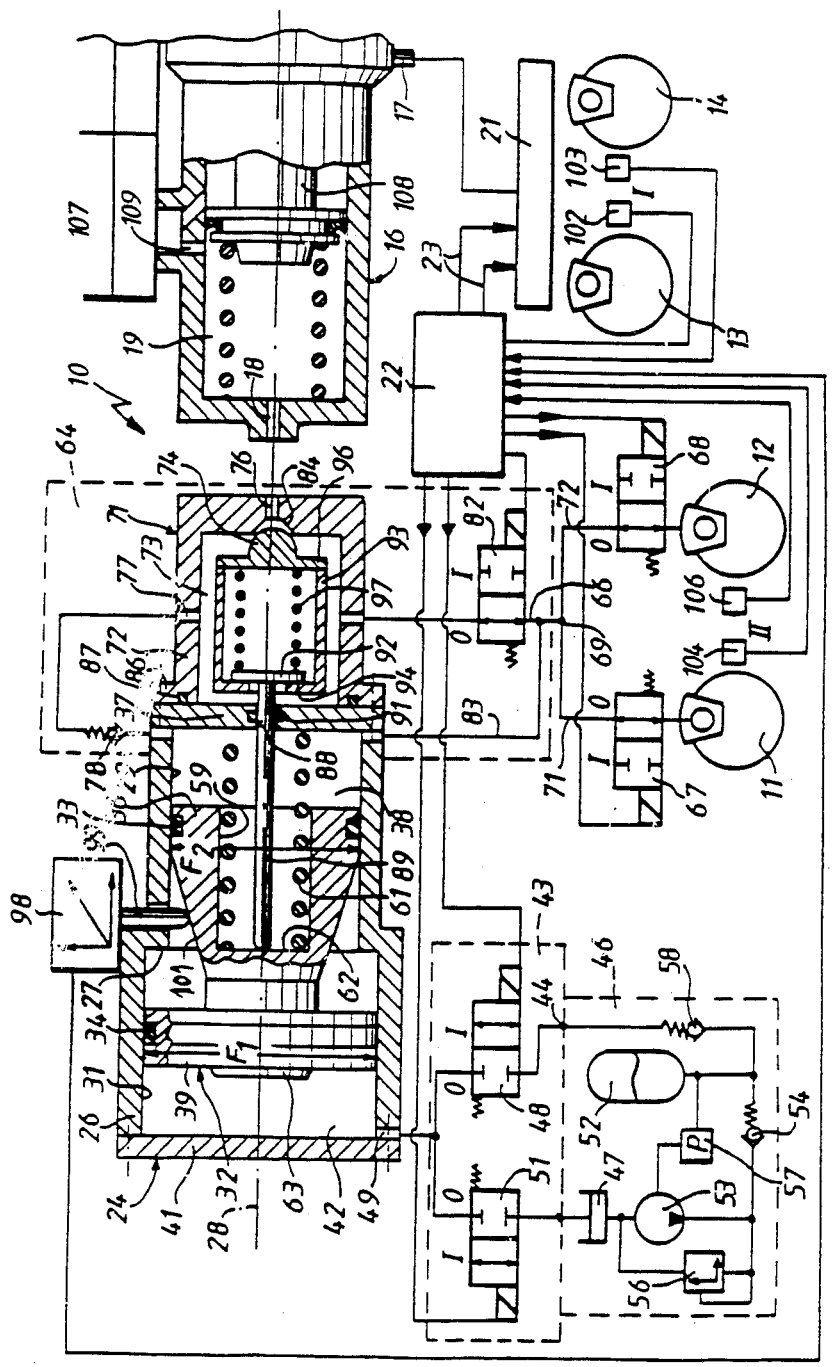

BRAKE PRESSURE SETTING DEVICE

BACKGROUND AND SUMMARY OF THE INVENTION

The invention concerns a brake pressure setting device for automatic control of brake pressure change phases and brake pressure retention phases of a control system stabilizing the dynamic behavior of a vehicle and operating by action on the operational brake installation of the vehicle, e.g. an antilocking control system and/or a drive slip control system for a vehicle braking system wherein at least the wheel brakes of two driven vehicle wheels are combined into a static brake circuit, and wherein the wheel brakes can each be shut off individually, or jointly, from a main brake pipe by means of a brake pressure control valve designed as a solenoid valve. A connection control solenoid valve is provided in the main brake pipe of a static brake circuit between an outlet pressure space of a brake unit provided for brake pressure supply, operable by the driver and the driven wheel brakes. A pressure modulator, designed as a stepped cylinder which has two housing steps of different diameters, within which the movable boundaries of a control pressure space and a modulation chamber are formed by corresponding diameter flanges of a modulator piston is also provided. The modulation chamber is a smaller diameter chamber and is connected to the main brake pipe of the static brake circuit between the connection control valve and brake pressure control valves for the wheel brakes. A return spring is provided for urging the modulator piston into its end position associated with maximum volume of the modulation chamber. In addition, the control pressure space of the pressure modulator can be alternatively connected to the pressure outlet of an auxiliary pressure, source or alternatively relieved to its non-pressurized container by a function control valve arrangement to provide a system wherein brake pressure changes can be controlled. A position indicator generates an electrical output signal characteristic of the position of the modulator piston as an input to an electronic control apparatus, which in turn generates output signals necessary for correct triggering of the connection control valve, the function control valve arrangement and the brake pressure control valves by processing the output signals of the position indicator and the output signals of wheel rotational speed sensors, which generate electrical output signals characteristic of the dynamic behavior of the vehicle wheels.

Such a brake pressure setting device in association with an antilocking system for a road vehicle is the subject matter of the applicant's own, older, German patent No. DE-3,723,875.2 which corresponds to pending U.S. application No. 07/220,168 filed July 18, 1988 now U.S. Pat. No. 4,877,296.

The antilocking system described therein is for a road vehicle with front axle/rear axle brake circuit subdivision and with a rear axle drive. The brake circuit associated with the driven rear wheels is designed as a static brake circuit with branch brake pipes, each leading from a main brake pipe to one of the rear wheel brakes. These branch brake pipes can be shut off, either individually or jointly, from the main brake pipe by a solenoid brake pressure control valve. The main brake pipe can itself be shut off from the outlet pressure space, associated with the static brake circuit of a brake unit provided for supplying brake pressure from a tandem main cylinder, operable by the driver and of conventional construction, by means of a solenoid connection control valve. Also provided is a Pressure modulator, designed as a stepped cylinder, which has two bore steps of different diameters connected to one another by means of a housing step. This cylinder defines the movable boundaries of a control pressure space and a modulation chamber, formed by flanges of corresponding diameters on a modulator piston. The control pressure space and the modulation chamber have boundaries fixed relative to the housing and formed by end walls of the modulator housing. The smaller diameter chamber is used as the modulator chamber and this is connected to the main brake pipe of the static brake circuit between the connection control valve and the brake pressure control valves. The pressure modulator is provided with a powerful return spring which attempts to force the modulator piston into its end position associated with maximum volume of the modulation chamber. The control pressure space, whose movable boundary is formed by the larger piston flange, can be alternatively connected, by means of a function control valve arrangement, to the pressure outlet of an auxiliary pressure source, by which means the modulator piston can be displaced in the direction of reducing the volume of the modulation chamber, or alternatively it can be connected to the non-pressurized sump tank of the auxiliary pressure source wherein the piston experiences a displacement in the direction of increasing the volume of the modulation chamber. This makes it possible to control brake pressure build-up and brake pressure reduction phases of the antilocking control system. Also provided is a position indicator which creates electrical output signals characteristic of the position of the modulator piston. One wheel rotational speed sensor is allocated to each of the driven vehicle wheels and the non-driven vehicle wheels for generating electrical output signals which, in level and/or frequency, are a measure of the wheel peripheral speeds of the vehicle wheels and, in terms of their changes, also contain information on the acceleration or deceleration of the vehicle wheels. These output signals of the wheel rotational speed sensors and the output signals of the position indicator are processed by an electronic control unit to provide output signals by means of which the solenoid valves of the brake pressure control device can be triggered in the order and combination corresponding to the control objective.

The patent No. De-3,723,875 mentioned reveals no measures of any type by which the brake pressure setting device could also be used in an analogous manner for a drive slip control system operating on the principle of retarding a vehicle wheel tending to spin, by reactivating its wheel brake to such an extent that a stable dynamic behavior of the vehicle is achieved even during acceleration. On the basis of the brake pressure setting device therein described, however, it would be desirable to achieve a drive slip control function in that, as soon as a spin tendency is recognizable on one of the driven vehicle wheels, the modulator piston is brought into its end position associated with maximum volume of the modulation chamber—by subjecting the control pressure space to pressure—in order to force brake fluid into the wheel brake of the vehicle wheel tending to spin, while the modulation chamber is simultaneously shut off from the outlet pressure space of the brake unit. This appears quite possible by analogous control of the function control valve arrangement and use of the brake pressure control valves, again assuming an appropriate design of the electronic control apparatus.

In a combined antilocking and drive slip control system realized in such a way however, "different" preparation phases would be necessary for the particular control operation, i.e. the modulator piston would have to have been previously brought into its end position associated with minimum volume for the anti-locking control operation, whereas it would first have to be brought into the end position associated with maximum volume of the modulation chamber as the initial position for the control in preparation for drive slip control operation.

In a traffic situation in which the brake pressure setting device has been prepared for drive slip control operation, and where the driver must unexpectedly brake, this would have the disadvantage that the "pole reversal" of the brake pressure setting device to a possible antilocking control operation, which now becomes necessary, would demand a relatively large period of time because the modulator piston must first be brought into its end position associated with minimum volume of the modulation chamber in order to make braking possible while using the antilocking control function.

Although it is conceivable that rapid response of the brake installation could be ensured in such a situation by initially doing without the antilocking control function, this would indubitably be very dangerous in the traffic situation assumed as an example, because if the road conditions already require drive slip control, it may be assumed with high probability that the antilocking control function will be necessary if abrupt braking occurs in such a situation.

The object of the instant invention is therefore to improve a brake pressure setting device of the aforementioned type in such a way that it can be switched over from drive slip control to antilocking control, as required, very much more rapidly.

The invention achieves this object by connecting a mechanical controlled valve between the outlet pressure space associated with the brake circuit of the driven vehicle wheels and the connection control valve. The modulation chamber of the pressure modulator is also connected via an outlet non-return valve to a valve chamber of this mechanically controlled valve, which can be driven into an open position by higher pressure in the modulation chamber relative to the pressure in the valve chamber. The mechanically controlled valve is designed as a displacement-controlled valve with a valve body displaced in the direction of its shut-off position for causing the outlet pressure space of the brake unit to be shut off relative to the valve chamber, by displacement of the modulator piston taking place, so as to reduce the volume of the modulation chamber. From an intermediate position of the piston, corresponding to a volume of the modulation chamber of between 75% and 50% of its maximum volume, the mechanically controlled valve arrives at its shut-off position. The mechanically controlled valve is designed as a pressure-controlled valve which, at least when the piston is located in the intermediate position mentioned, or in a position corresponding to a larger volume of the modulation chamber, can be driven into its open position by pressure in the outlet pressure space of the brake unit which is higher than the pressure in the valve chamber. Upon the appearance of a locking tendency of the wheels by the wheel brakes of the static brake circuit, the electronic control apparatus generates output signals operating the antilocking control operation. By means of these signals, the modulator piston is displaced into its intermediate position and subsequently, the connection control valve is switched into its shut-off position, while the brake pressure control valve of a vehicle wheel not tending to lock is driven into its shut-off position, and the function control valve arrangement is switched into a functional position causing pressure relief of the control pressure space. At the latest, on the appearance of a spin tendency on one of the driven vehicle wheels, the electronic control apparatus generates an output signal combination by means of which the drive slip control operation is controlled. Here the function control valve arrangement is driven into a functional position causing connection of the control pressure space to the pressure outlet of the auxiliary pressure source, while the connection control valve is driven into its shut-off position, and the brake pressure control valve of the vehicle wheel not tending to spin, is also driven into its shut-off position. In normal braking (driving or braking operations not subject to a control system) the connection control valve and the brake pressure control valves are held in their through-flow positions and the modulator piston, monitored by means of the position indicator, is held in a position which at least corresponds to the volume of the modulation chamber associated with its intermediate position.

According to this concept of the invention, the preparatory position of the modulator piston, provided for both drive slip control and antilocking control, is a position between its possible end positions associated with minimum and maximum volumes of the modulation chamber. From this intermediate position, the modulator piston can then be displaced "immediately", i.e. without further preparatory motion, either so as to increase the volume of the modulation chamber, as is necessary for an introductory pressure reduction phase of the antilocking control, or alternatively to decrease the volume of the modulation chamber, as is necessary for an introductory brake pressure build-up phase in the case of a drive slip control. Depending on which type of control is necessary, the pressure modulator is so dimensioned overall and the intermediate position of the modulator piston is so selected, that marked brake pressure changes in the particular change direction necessary are possible by means of the pressure changing strokes possible with this arrangement. If a single stroke of the modulator piston is not sufficient to achieve the brake pressure change necessary for the particular type of control, the modulator piston is returned to its initial position and the particular pressure change stroke is repeated. Here the pressure modulator operates like a hydraulically driven return pump in the event of a repetition of brake pressure reduction strokes. The piston positions can then be monitored and followed, as is necessary in this case, in a simple manner by means of the position indicator output signal. An essential advantage of the invention is then seen in the fact that the control responds immediately in every case and in the necessary control direction, i.e. there are no "dead periods" which would otherwise have to be accepted when switching over from one type of control to the other. A reduction in the sensitivity of the control caused by a possible necessary repetitive operation of pressure change strokes of the modulator piston, the reduction in sensitivity ultimately being the result of the time required for this purpose, is trivial at the most. This time can be limited to a minimum because the relevant piston displacements can be held to the necessary extent by appropriate assessment of the output signals of the wheel rotational speed sensors and the position indicator output signal. For example, where a single brake pressure change stroke is not sufficient to prepare for a further brake pressure change stroke, the modulator piston is only displaced as far in the direction of its initial position as is necessary to be able to achieve a sufficient change in the particular direction required during the next pressure change stroke.

In the preferred design of the brake pressure setting device the modulator piston is held in the intermediate position provided both as the initial position for a pressure reduction phase of the antilocking control and as the initial position for a pressure build-up phase of the drive slip control, both in normal driving operation and also in the case of normal braking operation not subject to an antilocking control. The setting device is, as it were, permanently prepared for a control operation which to this extent ensures optimum sensitivity of the particular control operation.

It is desireable if the difference in the volumes of the modulation chamber and the pressure modulator, between their minimum and maximum values, corresponds to between 20% and 50% of the volume of that quantity of brake fluid which has to be forced into the brake circuit of the driven vehicle wheels in order to generate the maximum possible brake pressure in the wheel brakes and that the modulator piston, in the intermediate position used as the initial position for the antilocking control and the drive slip control, takes up a position from which the volume of the modulation chamber can be increased by at least 10% of that volume of brake fluid which is accepted by the static brake circuit when the pressure is built up to the maximum value for which the brake installation is designed. With these dimensional relationships for the pressure modulator of the brake pressure setting device, a single brake pressure change stroke of the modulator piston will suffice to adequately stabilize the dynamic behavior of the vehicle in an overwhelming majority of the braking or acceleration situations requiring control.

It is advantageous if the mechanically controlled valve is designed as a seat valve whose valve body is supported by means of a preloaded return spring, which can be compressed in the axial direction, and wherein an actuation element penetrates axially displaceably and in a pressure-tight manner through a hole in a housing wall separating the modulation chamber of the pressure modulator from the valve chamber. Here relative motions of the valve body and the actuation element are limited by stops to a deflection corresponding to the stroke of the modulator piston from its initial position into the end position associated with minimum modulation chamber volume. The actuation element arrives in axially supporting contact with the modulator piston, at the latest, when the latter has executed a small fraction of its stroke from its initial position thus causing the reductions to the modulation chamber volume. The maximum opening stroke of the seat valve corresponds to only a small fraction of between 1/20 and 1/10 of the maximum possible stroke of the modulator piston in the direction of decreasing the volume of the modulation chamber. The mechanically controlled valve is designed as a ball/seat valve with a ball-ended valve body, located on the outside of a bottom of a cylindrical pan-shaped retention sleeve. A conical valve seat, designed as an opening, is on the valve chamber side of an inlet duct. The end of the actuation element is located within the valve chamber and is designed as a radial flange on the housing side facing towards the valve body and supports the return spring. Its side facing towards the modulation chamber has behind it, in its outer edge region, a contact flange, pointing radially inwards of the sleeve carrying the valve body. This provides the necessary construction of a mechanically controlled valve which can be used for the control of brake pressure build-up phases of the drive slip control. This valve shuts off the brake unit from the brake circuit of the driven vehicle wheels when the drive slip control responds.

By having the function control valve arrangement include a first 2/2-way solenoid valve and a second 2/2-way solenoid valve, whose basic positions are their shut-off positions and whose actuated positions are their through-flow positions and with the first solenoid valve being connected between a control connection of the pressure modulator and a high pressure outlet of the auxiliary pressure source and the second solenoid valve being connected between the control connection and a non-pressurized sump container of the auxiliary pressure source provides a simple and functionally reliable configuration of the function control valve arrangement provided for the stroke control of the modulator piston.

Other objects, advantages and novel features of the present invention will become apparent from the following detailed description of the invention when considered in conjunction with the accompanying drawings.

BRIEF DESCRIPTION OF THE DRAWINGS

The drawing shows an electro-hydraulic block circuit diagram of a brake pressure setting device according to the invention with a pressure modulator shown in section along its central axis.

DETAILED DESCRIPTION OF THE DRAWINGS

The drawing shows a brake pressure setting device 10 for a hydraulic two-circuit brake installation of a road vehicle. The vehicle is equipped with both an antilocking system and a drive slip control system. This brake pressure control device 10 is provided for controlling brake pressure reduction, brake pressure retention and brake pressure build-up phases of the antilocking control system and for controlling brake pressure build-up, brake pressure retention and brake pressure reduction phases of the drive slip control system.

For ease of explanation and not by way of limitation, it is assumed that the vehicle has a rear axle drive. The rear brakes 11 and 12 associated with the driven vehicle wheels are combined in a rear axle brake circuit II and the wheel brakes 13 and 14 associated with the non-driven front wheels are combined in a front axle brake circuit I. The two brake circuits I and II are assumed to be static brake circuits with a brake pressure supply from a stepped tandem main cylinder 16 of a known type. The tandem main cylinder 16 can be actuated by means of a brake pedal (not shown) via a braking force amplifier (not shown). As is normal in these types of brake systems, the front axle brake circuit I is connected to the pressure outlet 17 of the primary stage of the tandem main cylinder 16 and the rear axle brake circuit II is connected to the pressure outlet 18 of the secondary outlet pressure space 19 of the tandem main cylinder 16.

It is also assumed that the antilocking control, achieved on the front wheel brakes 13 and 14, operates on the known pump-back principle, in which brake fluid drained during a brake pressure reduction phase from one of the wheel brakes 13 and/or 14, subjected to the control system, is pumped back into the primary space of the tandem main cylinder 16. The electrohydraulic components of brake pressure control valves and an electrically triggered return pump, necessary for achieving a control of this type, are, for simplicity, not shown individually but are represented in the drawing only by a diagrammatically indicated electro-hydraulic control unit 21 associated with the front axle brake circuit I. This control unit 21 can be triggered by output signals from an electronic control apparatus 22 provided for the control of both the antilocking control operation and the drive slip control operation, as is indicated diagrammatically by control signal lines 23.

The brake pressure setting device 10, provided for brake pressure control of the rear axle brake circuit II in both antilocking control operation and drive slip control operation, includes a pressure modulator 24, which includes a stepped cylinder casing 26 which has two bore steps 29 and 31, which: are adjacent to one another along the longitudinal direction of the housing; are coaxial relative to the central longitudinal axis 28 of the modulator housing 26; and are offset relative to one another by a radial step 27. A correspondingly displaceable stepped modulator piston 32 is sealed against the bore steps 29 and 31 by means of ring seals 33 and 34 respectively, which are fixed relative to the piston.

A functional modulation chamber space 38 of the pressure modulator 24 has a movable boundary in the axial direction, formed by the smaller diameter piston flange 36 of the modulator piston 32 within the smaller bore step 29, and a fixed boundary formed by the end wall 37 of the modulator housing 26 which closes off the bore step 29. Brake pressure reduction and brake pressure build-up phases of the types of control to be considered can be controlled by controllable volume changes of the modulation chamber 38.

A further functional control pressure space 42, has a moveable boundary in the axial direction, formed by the larger diameter annular flange-shaped piston step 39 of the modulator piston 32 and a fixed boundary formed by end wall 41 closing off the correspondingly larger bore step 31 of the modulator housing 26. The control pressure space 42 can be connected via a function control valve arrangement, either to a high pressure level outlet 44 of a hydraulic auxiliary pressure source 46, so as to be subjected to its outlet pressure, or alternatively connected to its non-pressurized sump tank 47 and therefore relieved of pressure, or, as a third alternative, it can be shut off both against the pressure outlet 44 and against the sump tank 47 of the auxiliary pressure source 46.

In the particular illustrative example shown, the function control valve arrangement 43 includes a first 2/2-way solenoid valve 48, which is connected between the control connection 49 of the control pressure space 42 of the pressure modulator 24 and the pressure outlet 44 of the auxiliary pressure source 46. A second 2/2-way solenoid valve 51 is connected between the control connection 49 of the pressure modulator 24 and the sump tank 47 of the auxiliary pressure source 46. The auxiliary pressure source 46 has the conventional accumulator 52, charging pump 53, accumulator charging valve 54, pressure limiting valve 56, pressure monitor 57 controlling the charging operation and outlet non-return valve 58. The two 2/2-way solenoid valves can be switched from the basic "O" blocking position by triggering them with an output signal from the electronic control apparatus 21, alternatively, into their actuated "I" through-flow positions.

On the smaller piston step 36 of the modulator piston 32, there is a central blind hole 59 open towards the modulation chamber 38 and having an axial depth corresponding at least to the block length of a "powerful" return spring 61 which is supported, at one end on the bottom 62 of this blind hole 59 and at the other end on the end wall 37 providing the axial fixed boundary of the modulation chamber 38. This return spring 61 attempts to force the modulator piston 32 into its lefthand end position, as shown in the drawing, which left hand position is associated with a maximum volume of the modulation chamber 38 and with a minimum volume of the control pressure space 42. In this end position, the modulator piston 32 is supported on the fixed boundary end wall 41 of the modulator housing 26 by means of a central stop protrusion 63 which extends only slightly in the axial direction.

The other end position of the modulator piston 32, associated with a minimum volume of the modulation chamber 38 and with a maximum volume of the control pressure space 42 of the pressure modulator 24, is that position which is indicated by contact between the right hand side of the larger flange-shaped piston step 39 and the radial housing step 27.

Also provided is a pressure inlet control valve arrangement 64, which in normal braking operation, i.e. one not subject to a control system, provides a connection between the secondary outlet pressure space 19 of the tandem main cylinder 16 and section 66 of the main brake pipe branching off to the rear wheel brakes 11 and 12 so that by actuation of the main brake unit 16 alone, brake pressure can be built up in the rear axle brake circuit II and reduced again.

Before the construction and further functions of this pressure inlet control valve arrangement 64 are considered in more detail, it should be mentioned that the left-hand rear wheel brake 11 and the right-hand rear wheel brake 12 are each associated with a brake pressure control valve 67 and 68 respectively, by means of which the brake pipe branches 71 and 72 emerging from the branch position 69 of the main brake pipe 66 of the rear axle brake circuit II can be shut off individually, or jointly, by output signals of the electronic control apparatus 22.

These brake pressure control valves 67 and 68 are designed as 2/2-way solenoid valves with a basic "O" through-flow position in which brake pressure can be built up or reduced in the particular rear wheel brake 11 and/or 12 and with an actuated "I" shut-off position which provides the brake pressure retention function at the rear wheel brakes 11 and 12.

The inlet control valve arrangement 64 includes a valve 71 whose displacement is controlled both as a function of the position of the modulator piston 32 and the pressure of the outlet pressure of the brake unit 16. In the shown open position of this control valve 71, the secondary outlet pressure space 19 of the tandem main cylinder 16, associated with the rear axle brake circuit II, is connected so that it communicates with valve chamber 73 whose boundaries are formed by the valve housing 72 of this mechanically controlled valve 71. In addition to an inlet duct 76 which can be closed by means of the valve body 74 and which runs coaxially with the central longitudinal axis 28 of the pressure modulator 24, the valve chamber 73 has a further radial inlet duct 77 which is connected via an outlet non-return valve 78 to the modulation chamber 38 of the pressure modulator 24. The modulation chamber 38 also has a radially extending outlet duct which is connected via a connection control valve 82, which can be triggered by output signals from the electronic control apparatus 22, to the section 66 of the main brake pipe of the rear axle brake circuit II branching to the rear wheel brakes 11 and 12. The outlet non-return valve 78 is acted upon in the opening direction by higher pressure in the modulation chamber 38 relative to that in the valve chamber 73 of the mechanically controlled valve 71. A typical value of the pressure difference leading to a transition of the outlet non-return valve 78 into its open position is between 2 and 4 bar.

In addition, the modulation chamber 38 is connected to the section 66 of the main brake pipe of the rear axle brake circuit II, branching to the rear wheel brakes 11 and 12 by means of an inlet duct 83.

The mechanically controlled valve 71 is designed as a seat valve with a hemispherical valve body 74 which can be forced against a conical valve seat 84 via which the central inlet duct 76 of the valve housing 72 enters the valve chamber 73. The valve housing 72 is designed in cylindrical pan shape and is fastened by means of a fastening flange 86 extending radially from an edge of the housing shell of the vale 71 to the end wall 37 of the modulator housing 26 which forms the axial boundary fixed relative to the housing of the modulation chamber 38 of the pressure modulator 24. The valve housing 72 is sealed by means of an annular seal 87. The end wall 37 forming the boundary of the valve chamber 73 against the modulation chamber 38 is provided with a central axial hole 88 through which a slender elongated rod-shaped actuation ram 89 penetrates in a displaceable manner and which is sealed against this central hole 88 by means of an annular seal 91 fixed relative to the housing.

The actuation ram 89 has a radial flange 92 on its end section located within the valve chamber 73. The flange 92 can hold the hemispherical valve body 74 by means of a cylindrical pan-shaped sleeve 93 solidly connected to the valve body 74. The shell of the sleeve 93 has a stop flange 94 pointing radially inwards and this passes behind the ram flange 92 and between the ram flange 92 and the end wall 37 of the modulator housing 26. Between the ram flange 92 and the bottom 96 of the sleeve 93, adjacent the valve body 74, extends a relatively weak preloaded return spring 97 which forces the valve body 74 into its position with the largest possible axial distance from the ram flange 92. This is indicated, in the position of the valve body 74 shown, by contact between the radially inward-pointing flange 94 of sleeve 93 and the contact area of the ram flange 92. By "weak preload" it is meant, that even if the return spring 97 acting on the valve body 74 is loaded to the point where it "goes solid", the preload is not greater than that on the return spring 61 which attempts to force the modulator piston 32 into its left-hand position, associated with maximum volume of the modulation chamber 38.

The modulator piston 32 is shown in an intermediate position between its possible end positions. This intermediate position corresponds to half the maximum volumes of the modulation chamber 38 and the control pressure space 42. The axial lengths of the actuation ram 89 and the cylindrical pan-shaped sleeve of the valve body 74 are matched to one another in such a way that, if the modulator piston 32 takes up the intermediate position shown, and the actuation ram 89 is then supported on the bottom 62 of the blind hole 59 of the modulator piston 32, the valve body 74 will be lifted from its valve seat 84. This means that the mechanically controllable valve 71 takes up its open position, but with even a slight displacement of the modulator piston 32 in the direction of reducing the volume of the modulation chamber 38 will be sufficient to hold the valve body 74 in sealing contact with its valve seat 84, i.e. it will be sufficient to drive the mechanically controlled valve 71 into its shut-off position. In addition, the axial length of the sleeve 93 of the valve body 74 and the "solid" length of the return spring 97 acting on the valve body 74 and the ram flange 92 are matched together in such a way that the modulator piston 32 can be pushed into its right-hand position, associated with minimum volume of the modulation chamber 38.

The pressure modulator 24 is equipped with a position indicator 98 which provides an electrical output signal continually varying with deflections of the modulator piston 32 and characteristic of its current position. This electrical output signal is fed as information input to the electronic control unit 22. This position indicator 98 can be designed as an intrinsically known type, e.g. as a resistance signal generator or an inductive signal generator and records the radial deflections of an actuation pin 99 associated with axial displacements of the modulator piston 32. The free end of the actuation pin 99 is supported so that it can slide on a conical outside surface 101 of the modulator piston 32. This outside surface extends between the piston flange 36 of the modulator piston 32 sealed against the smaller bore step 29 and the larger piston flange 39 sealed against the larger bore step 31 and becomes narrower, as may be seen from the drawing, towards this larger piston step 39. The axial extent and arrangement of this conical outside surface 101 of the modulator piston 32 is arranged in such a way that the output signal of the position indicator 98 is correlated in an unambiguous manner with the piston position in each of the possible intermediate positions between the two end positions of the piston. The position indicator 98 is preferably so designed that there is a linear relationship between its output signal and the piston position.

OPERATION OF THE BRAKE CONTROL

The functional description of the brake pressure setting device for dynamic conditions of the vehicle requiring antilocking and drive slip control are taken as examples and it is assumed that the control signals necessary for correct triggering in the particular control sense of: the function control valve 48 and 51, the connection control valve 82, the pressure inlet control valve arrangement 64, and the brake pressure control valves 67 and 68 of the rear axle brake circuit II are provided by the electronic control apparatus 22. The electronic control apparatus, uses known criteria wherein it essentially compares and differentiates output signals of wheel rotational speed sensors 102, 103, 104 and 106, which are individually associated with the vehicle wheels and which generate output signals characteristic in level and/or frequency of the dynamic behavior of the wheels and also by taking into account the position indicator 98 output signals of the modulator piston 32. If appropriate, the output signal of a brake light switch (not shown) can also be fed to the electronic control apparatus 22. It is also assumed that, given knowledge of these control functions, an appropriate design of the electronic control apparatus 22 is possible by one skilled in the art without difficulty and hence the details of the electronic control is omitted for simplicity sake in this application.

A "normal" braking situation not subject to an antilocking control system, is first considered.

When the vehicle is started up by switching on the ignition (not shown), the auxiliary pressure source 46 is activated and, at the same time, or after a slight time delay, the second 2/2-way solenoid valve 51, used as an outlet valve of the function control valve arrangement 43, will be driven into its actuated "I" through-flow position, while the first 2/2-way solenoid valve 48 of the function control valve arrangement 43 remains held in its basic "O" shut-off position. In consequence, pressure medium can escape from the control pressure space 42 of the pressure modulator 24, whose piston 32 experiences a displacement due to the effect of the return spring 61 such as to produce an increase in volume of the modulation chamber 38, which leads to the piston 32 taking up an end position at the left-hand position in the drawing. this position is associated with a maximum volume of the modulation chamber 38. As soon as the modulator piston 32 has reached this extreme left end position, which can be recognized from the output signal of the position indicator 98, the triggering of the second 2/2-way solenoid valve 51 of the function control valve arrangement 43 is cancelled and this valve 51 is therefore switched back into its basic "O" shut-off position. The control pressure space 42 of the pressure modulator 24 is now shut off again from both the sump container 47 and the pressure outlet 44 of the auxiliary pressure source 48. During this phase of preparing the brake pressure setting device 10 for a normal braking operation, the connecting control valve 82 of the pressure inlet control valve arrangement 64 is held in its basic "O" through-flow position. The brake pressure control valves 67 and 68 of the rear axle brake circuit II, on the other hand, are switched during this preparatory phase into their actuated "I" shut-off positions. This is desirable for reasons associated with maintaining a good de-aeration condition in the rear wheel brakes 11 and 12. While the modulator piston 32 moves into its end position associated with maximum volume of the modulation chamber 38 during this preparatory phase, brake fluid flows from the valve chamber 73 of the mechanically controlled valve 71 via the open connection control valve 82 into the modulation chamber 38 of the pressure modulator 24. The quantity of brake fluid flowing out of the valve chamber 73 of the mechanically controlled valve 71 is obtained by brake fluid which flows from the secondary outlet pressure space 19 of the main cylinder 16 into the valve chamber 73. The open position of the ball/seat valve 71 necessary for this operation is taken up, at the latest, when the modulator piston 32 has approximately reached its intermediate position, from which, if the mechanically controlled valve 71 had been previously closed, a slight depression forms in the modulation chamber 38 and in the valve chamber 73 which leads to the valve body 74 being lifted from its seat 84 under the influence of the atmospheric pressure present in the secondary outlet pressure space 19 of the main cylinder 16. Assuming a design of the valve return spring 97 such that its preload is equivalent to a pressure of more than 1 bar, the transition of the mechanically controlled valve 71 into its open position only occurs when the modulator piston 32 has been lifted off the actuation ram 89 in the axial direction. As soon as the valve 71 has opened, the valve body 74 then remains in its open position due to the friction of the ring seal 91 because the actuation ram 89 is pressure balanced. Brake fluid flowing from the secondary outlet pressure space 19 of the main cylinder 16 is again obtained from reservoir 107 of the main cylinder 16 which, in the basic position of the secondary piston 108, is connected to the secondary outlet pressure space 19 of the tandem main cylinder via the balance flow path 109 shown as a snifting orifice.

As soon as the modulator piston 32 has reached its "left-hand" end position, associated with maximum volume of the modulation chamber 38, and which is "recognized" from the position output signal of the position indicator 98 as characteristic of it (and/or from the drop in the signal obtained by differentiation with respect to time of the position indicator output signal, which changes continuously with the piston position), the brake pressure control valves 67 and 68 are switched back into their basic "O" through-flow positions and the second function control valve 51 is also switched back into its basic "O" shut-off position. The brake installation is now prepared for normal brake operation in which brake pressure build-up and brake pressure reduction phases are controlled by the brake unit 16 alone.

If, in normal braking operation, a change occurs in the position of the modulator piston 32, e.g. as the result of a leak in the first function control valve 48, which can be recognized using the position indicator output signal, the second function control valve 51 is driven back into its through-flow "I" position until the modulator piston 32 has again reached its left-hand end position, whereupon this second function control valve 51 is switched back into its shut-off basic position, advantageously with a small time delay relative to the modulator piston 32 reaching its end position.

In order to explain the specified functions of the brake pressure setting device 10, so far explained in terms of its construction, a typical antilocking control cycle of the antilocking system of the vehicle is now considered in which a locking tendency occurs on one of the driven vehicle wheels. For explanation purposes it is assumed that this occurs on the left-hand rear wheel represented by the wheel brake 11.

With respect to the control algorithm on which the antilocking system operates, it is assumed—as a simplification—that a brake pressure reduction phase is introduced when, on the vehicle wheel considered, limiting values $\lambda_{BM}$ and/or $b_{BM}$ of the brake slip $\lambda_B$ or of the wheel peripheral retardation $b_B$ are exceeded, alternatively or cumulatively. These limits, each considered independently, indicate upper limits of the range of values of brake slip $_B$, or wheel peripheral retardation $b_B$ which may still be considered as being compatible with adequate dynamic stability of the vehicle. Without any limitation of generality, the values $\lambda_B=O$ and $b_B=O$ can be assumed as the lower limits for these ranges of values of the brake slip $\lambda_B$ and the wheel peripheral retardation $b_B$, so that the values $\lambda_{BM}/2$ and $b_{BM}/2$ can be taken as the averages of the brake slip values and wheel peripheral retardation values compatible with sufficient dynamic stability of the vehicle.

As soon as the brake slip on one of the driven vehicle wheels exceeds a threshold value $\lambda_{Bm}$ and/or $b_{Bm}$ respectively—these values being lower than the limiting values $\lambda_{BM}$ and $b_{BM}$ but still significantly higher than the average values $\lambda_{BM}/2$ and $b_{BM}/2$ of the particular range of values considered and being, for example, 75% of the particular upper limit $\lambda_{BM}$ or $b_{BM}$—the electronic control apparatus 22 assesses this as meaning that a locking tendency is appearing on the vehicle wheel considered and that the brake pressure setting device 10 must therefore be prepared for a brake pressure reduction phase. For this purpose, the electronic control apparatus 22 generates output signals by means of which the two brake pressure control valves 67 and 68 are driven into their shut-off "I" positions and it also generates an output signal by means of which the first 2/2-way solenoid valve 48 of the function control valve arrangement 43 is driven into its through-flow "I" position.

The consequence of this is that brake pressure can no longer be built up in the two wheel brakes 11 and 12 of the rear axle brake circuit II, which includes the vehicle wheel tending to lock because brake pressure control valves 67 and 68 are blocked, and that the high outlet pressure present at the pressure outlet 44 of the auxiliary pressure source 46 is now connected into the control pressure space 42 of the pressure modulator 24 via first function control valve 48. This has the further consequence that the modulator piston 32 of the pressure modulator now experiences a displacement such as to reduce the volume of the modulation chamber 38 with the result that brake fluid is forced back from the modulation chamber 38 via the valve chamber 73 of the mechanically controlled valve 71 into the secondary outlet pressure space 19 of the brake unit 16 which, because the secondary piston 108 of the brake unit 16 experiences in consequence a displacement in the "backward direction", also leads to a feedback signal indicating that the antilocking system is preparing to respond and which can be felt on the brake pedal.

This triggering of the brake pressure control valves 67 and 68 of the rear brake circuit II and of the first 2/2-way solenoid valve 48 of the function control valve arrangement 43 is maintained until such time as the modulator piston 32 has reached its intermediate position, which can be obtained from the output signal of the position indicator 98 and in which the volumes of the modulation chamber 38 and the control pressure space 42, each correspond to half their maximum volumes. As soon as this intermediate position is reached, the brake pressure control valves 67 and 68 of the rear axle brake circuit II are switched back into their basic "O" through-flow positions and the first 2/2-way solenoid valve 48 of the function control valve arrangement 43 is also switched back into its basic "O" shut-off position.

By this means the modulator piston 32 is "hydraulically locked" in the intermediate position taken up at this time and also brake pressure can be built up again in the wheel brakes 11 and 12 by increasing the force with which the brake unit 16 is actuated, because the two brake pressure control valves 67 and 68 now reassume their through-flow "O" positions.

If the locking limit, represented by the particular upper threshold values $\lambda_{BM}$ and $b_{BM}$ of the brake slip $\lambda_B$ and the wheel peripheral retardation $b_M$ respectively, is subsequently exceeded on the vehicle wheel considered, the electronic control apparatus 22 reacts to this situation by emitting output signals by means of which: the connecting control valve 82 is driven into its shut-off "I" position; the brake pressure control valve 68 of the vehicle wheel which is not tending to lock is also driven into its shut-off "I" position; and the second 2/2-way solenoid valve 51 of the function control valve arrangement 43 is driven into its through-flow "I" position.

In consequence, the brake pressure in the wheel brake 12 of the vehicle wheel not tending to lock is held at the value previously selected whereas, on the other vehicle wheel, the brake pressure in its wheel brake 11 is reduced because, due to the relief of pressure from the control pressure space 42 of the pressure modulator 24 to the sump container 47 of the auxiliary pressure source 46, the control piston 32 of the pressure modulator 24 experiences a displacement such as to increase the volume of the modulation chamber 38 so that brake fluid can flow from the wheel brake 11 subject to the control system into the modulation chamber 38. The secondary outlet pressure space 19 is then shut off from the modulation chamber 38 by the non-return valve 78 which is in the shut-off position and by the connecting control valve 82 which is also in the shut-off "I" position.

A brake pressure retention phase on the left-hand rear wheel brake 11, subjected to the antilocking control system necessary after such a controlled brake pressure reduction phase, is controlled by both the second 2/2-way solenoid valve 51 of the function control valve arrangement 53 and the brake pressure control valve 67 of this wheel brake being again switched over into their shut off "O" and "I" positions, respectively. As soon as this switch-over process has occurred, the connecting control valve 82 can be switched back into its basic "O" through-flow position and the same can happen to the brake pressure control valve 68, previously switched over into its shut-off "I" position, which is then moved to its through-flow "O" position so that brake pressure can therefore be built up again on the wheel brake 12 on which no locking tendency had occurred.

Such a brake pressure restoration phase on the wheel brake 12 of the vehicle wheel, not previously tending to lock, advantageously occurs as "joint action" with the pressure modulator 24 in such a way that the first function control valve 48 of the function control valve arrangement 43 is switched over into its actuated "I" through-flow position so that the control pressure space 42 is again connected to the high pressure outlet 44 of the auxiliary pressure source 46 and, in consequence thereof, the modulator piston 32 is displaced so as to reduce the volume of the modulation chamber 38.

It is assumed, and this must be mentioned, that the area ratio $F_1/F_2$ between the effective cross-sectional areas of the larger piston step 39 and the effective cross-sectional area $F_2$ of the smaller piston step 36 has been chosen sufficiently large for the modulator piston 32 to be displaced so as to produce a reduction in the volume of the modulation chamber 38 by subjecting the larger piston area $F_1$ to the outlet pressure of the auxiliary pressure source 46 and against the action of the return spring 61 of the pressure modulator 24 and the pressure present in its modulation chamber 38.

The triggering of the first 2/2-way solenoid valve 48 into its actuated through-flow "I" position produces the connecting between the pressure control space 42 and the high pressure outlet 44 of the auxiliary source 46, until such time as the modulator piston 32 has again reached its intermediate position, which can be monitored by means of the position indicator 98 output signal, and from which position the brake pressure reduction phase on the wheel brake 11 subject to the control system had been initiated. While the antilocking control system is activated, the modulator piston 32 is displaced so as to reduce the volume of the modulation chamber 38, at most into the intermediate position mentioned.

If the locking tendency has been completely removed by the antilocking control system, the modulator piston 32 is held in the position reached at that point while the braking action continues. This may be recognized, for example, by means of a brake light switch output signal (not shown) which is present during this period. The modulator piston is only driven back into its initial position associated with maximum volume of the modulation chamber 38 after termination of the braking situation.

The control system operates in a completely analogous manner when a locking tendency occurs on both driven vehicle wheels.

Although "counter phase" control, in the sense that brake pressure is reduced on one of the wheel brakes 11 or 12 while brake pressure is built up simultaneously on the other wheel brake 12 or 11, is impossible, brake pressure can be changed on one of the two wheel brakes 11 or 12 while the brake pressure is kept constant on the other wheel brake.

In order to explain further specified functions of the brake pressure setting device 10, it is now assumed that a spin tendency occurs on one of the driven vehicle wheels, e.g. the left-hand rear wheel, this requiring activation of the drive slip control system. The conventional control algorithm is assumed for this, i.e. retarding a vehicle wheel tending to spin by activation of its wheel brake to the extent that its drive slip $\lambda_A$ remains within a range of values associated with both good drive acceleration and sufficient driving stability. This range of values being bounded by an upper limit $\lambda_{AM}$ above which the control system must respond. In addition, the control system should respond when an upper limit $b_{AM}$ of the wheel peripheral acceleration $b_A$ is exceeded with control beginning with a brake pressure build-up phase on the brake of the spinning vehicle wheel.

In the case of the drive slip control also, the brake pressure setting device 10 is prepared for control operation in that, as soon as a spinning tendency appears—which can be recognized from the fact that the values $\lambda_{Am}$ and $b_{Am}$ of the drive slip $\lambda_A$ and/or of the wheel peripheral acceleration $b_A$ are exceeded, these values being lower than the upper limiting values $\lambda_{AM}$ and $b_{AM}$ and for example, 75% of the latter in each case, but higher than the corresponding average values of the ranges of values compatible with sufficient driving stability—the modulator piston 32 is brought into the intermediate position shown. For this purpose, the first 2/2-way solenoid valve 48 of the function control valve arrangement 43 is—for a short period—switched into its through-flow "I" position and is switched back again into its shut-off "O" basic position as soon as the output signal of the position indicator 98 shows that the initial position of the piston 32 suitable for drive slip control operation has been reached.

In order to trigger the brake pressure build-up phase introducing the drive slip control in the wheel brake 11 of the vehicle wheel tending to spin, after the brake pressure control valve 68 of the wheel brake 12 of the vehicle wheel not tending to spin has Previously been switched into its shut-off "I" position, the first 2/2-way solenoid valve 48 of the function control valve arrangement 43 is again switched over into its through-flow "I" position. In consequence, the modulator piston 32 experiences a displacement such as to reduce the volume of the modulation chamber 38, which displacement from this initial position is also transferred to the valve body of the mechanically controlled valve 71 by means of the return spring 97, after a small initial section of the brake pressure build-up stroke of the modulator piston 32 reaches its shut-off position, sealing the valve seat 84 so that the secondary outlet pressure space of the main cylinder 16 is now shut off relative to the valve chamber 73 of the mechanically controlled valve 71.

Brake fluid forced out of the modulation chamber 38 of the brake pressure modulator 24 by the piston displacement flows via the brake pressure control valve 67, which is in its basic through-flow "O" position, to the wheel brake 11 used for the control, so that the vehicle wheel tending to spin is again retarded by the brake pressure building up in this wheel brake. The connection control valve 82 can either remain in its basic "O" through-flow position, or be driven into its shut-off "I" position. To the extent that brake fluid is forced out of the pressure modulation chamber 38 into the valve chamber 73, either via the outlet non-return valve 78 opening when pressure builds up in the modulation chamber 38, or via the connection control valve 82, which is in its open through-flow "O" position, this brake fluid cannot flow into the secondary outlet pressure space 19 of the tandem main cylinder 16 because the ball/seat valve 71 is in its shut-off position.

If the spin tendency of the vehicle wheel subject to the control system now decreases at least to the extent that the wheel is no longer being accelerated, which is "recognized" by the electronic control apparatus 22 from a decrease in the signal obtained by differentiation, with respect to time, of the output signal of the wheel rotational speed sensor 104 of the left-hand rear wheel, a brake pressure retention phase on the vehicle wheel brake 11 which is advantageous in this situation, can be achieved by switching the brake pressure control valve 67 of the wheel brake 11 into its shut-off "I" position. Simultaneously with this, or after a slight delay, the first 2/2-way solenoid valve 48 of the function control valve arrangement 43 can also be switched back into its shut-off basic "O" position. If the spinning tendency of the vehicle wheel considered then decreases, recognizable for example from the fact that the slip becomes less than the threshold value $\lambda_{Am}$ or, if appropriate, a lower threshold value $\lambda_{AO}$, the drive slip control is concluded by a brake pressure reduction phase, for whose control, the first 2/2-way solenoid valve 48 of the function control valve arrangement 43 is switched back into its basic shut-off "O" position wherein the control pressure space 42 of the pressure modulator 24 is shut off from the pressure outlet 44 of the auxiliary pressure source 46. The second 2/2-way solenoid valve 51 of the function control valve arrangement 43 is switched back into its through-flow "I" position providing pressure relief of the control pressure space 42, and the brake pressure control valve 67 of the wheel brake 11 of the vehicle wheel, subjected to the control system, is switched back into its basic through-flow "O" position and, if the connection control valve 82 had previously been driven into its shut-off "I" position, it is also switched back into its basic through-flow "O" position in which the valve chamber 73 of the mechanically controlled valve 71 is connected to the main brake pipe 66 of the rear axle brake circuit II. It is advantageous here to first switch the second 2/2-way solenoid valve 51 of the function control valve arrangement 43 back into its basic shut-off "O" position as soon as the modulator piston 32 has again reached its intermediate position in order to continue to hold the modulator piston 32 for a minimum period of time in its initial control position. It will then respond more rapidly if a renewed pressure build-up phase becomes necessary.

Consequently, provision is also made, in a particular design variant of the electronic control unit 22 of the brake pressure setting device 10, for the modulator piston 32 to be brought into the intermediate position shown as soon as the vehicle comes into operation and for this position to be also maintained in a normal braking action, one not subject to the antilocking control. this is possible in a simple manner by an analogous use of the output signal of the position indicator 98. The brake pressure setting device is then—ab initio,—prepared for both antilocking and drive slip control operation, which is beneficial to a rapid and appropriate response of the particular control system as a function of the response threshold values $\lambda_{BM}$ and $b_{BM}$ or $b_{AM}$ and $b_{AM}$. The electronic control apparatus 22 can then also be kept simpler because the processing and control complication, which would otherwise be necessary for preparation of the brake pressure setting device 10, disappears if this preparation only takes place when low "sensitivity threshold values" $\lambda_{Bm}$ and $b_{Bm}$ or $\lambda_{Am}$ and $b_{Am}$ are exceeded.

In a further, particular modification of the brake pressure setting device 10, provision is made for the initial position of the modulator piston 32, from which the antilocking control is initiated in the sense of a brake pressure reduction phase and from which the drive slip control is initiated in the sense of a brake pressure build-up phase on the wheel brake of the vehicle wheel subject to the particular control system, need not be, a "symmetrical" position, in the sense that the volume increase attainable with a single pressure change stroke of the modulator piston 32—for pressure reduction in an introductory antilocking control phase, or volume reduction for pressure build-up in a drive slip control phase—in each case be half the value of the maximum volume of the modulation chamber 38 of the pressure modulator 24. Instead, the pressure modulator 24 is laid out in such a way that an intermediate position for its modulator piston 32 is so selected as the initial position for the two types of control that, from the intermediate position, the maximum brake pressure can be built up in both wheel brakes of the brake circuit II of the driven vehicle wheels with a single brake pressure increase stroke for the purpose of drive slip control; whereas, in the case of an introductory brake pressure reduction phase, only a pressure reduction stroke of the modulator piston 32 is available, such that its complete exploitation will result in the brake pressure, of at most, one of the two wheel brakes 11 or 12 of the brake circuit II of the driven vehicle wheels, being reduced completely from its maximum possible value.

If, assuming such a design of the pressure modulator 24 of the brake pressure setting device 10, a brake pressure reduction to the greatest possible extent is necessary in both wheel brakes 11 and 12 of the brake circuit II during the course of an antilocking control cycle, this is possible as follows.

After either the brake pressure has been completely reduced by a first brake pressure reduction stroke of the modulator piston 32 on one of the two wheel brakes 11 or 12, or the brake pressure has been reduced on both wheel brakes 11, 12 to half of its maximum possible value, the brake pressure control valves 67 and 68 of both wheel brakes 11 and 12 are driven into their shut-off "I" positions. The first 2/2-way solenoid valve 48 Of the function control valve arrangement 43 is then switched over into its through-flow "I" position, while the second 2/2-way solenoid valve 51 of the function control valve arrangement 43 is held in its basic shut-off "O" position. The modulator piston 32 now experiences a displacement in the direction of reducing the volume of the modulation chamber 38 caused by the control pressure space 42 being subject to the outlet pressure of the auxiliary pressure source 46. In consequence, brake fluid is forced out of the modulation chamber 38 into the valve chamber 73 of the mechanically controlled valve 71 and from the latter into the secondary outlet pressure space 19 of the tandem main cylinder 16. The pressure modulator 24 acts in this case as a return pump by means of which brake fluid from one of the wheel brakes, subject to the control system, is pumped back into the associated outlet pressure space 19 of the brake unit.

As soon as the modulator piston 32 has again reached its initial position suitable for both antilocking and drive slip control, which can be recognized from the output signal of the position indicator 98, the pressure modulator 24 is again switched over to pressure reduction operation.

For this purpose, the first 2/2-way solenoid valve 48 of the function control valve arrangement 43 is switched back into its basic shut-off "O" position and the second 2/2-way solenoid valve 51 of the function control valve arrangement 43 is driven into its through-flow "I" position connecting the control pressure space 42 of the pressure modulator 24 to the sump tank 47 of the auxiliary pressure source 46 so that the modulator piston 32 again experiences a displacement in the direction of increasing the volume of the modulation chamber 38 so that the "residual" pressure reduction in the brake circuit II of the driven vehicle wheels can also be achieved.

It is obvious that this type of brake pressure reduction control, in control phases of an antilocking control cycle or of brake pressure build-up phases in the course of a drive slip control cycle, is not limited to particular dimensioning of the pressure modulator 24, but that it can be also be utilized in an analogous modification using any designs of the pressure modulator 24 with respect to its possible brake pressure reduction strokes and brake pressure build-up strokes.

Although the present invention has been described and illustrated in detail, it is to be clearly understood that the same is by way of illustration and example only, and is not to be taken by way of limitation. The spirit and scope of the present invention are to be limited only by the terms of the appended claims.

What is claimed:

1. Brake pressure setting device for automatic control of brake pressure change and brake pressure retention phases of an antilocking control system and a drive slip control system for stabilizing the dynamic behavior of the vehicle by acting on the wheel brakes of a road vehicle, comprising:

wheel brakes means for two driven vehicle wheels which are combined into a static brake circuit;

each of said wheel brakes means being operable to be shut off individually or jointly from a main brake pipe by means of a solenoid brake pressure control valve means;

a solenoid connection control valve means switchable to shut off the main brake pipe from an outlet pressure space, associated with a static brake circuit of a main brake unit provided for brake pressure supply and operable by the driver;

a pressure modulator unit designed as a stepped cylinder which has two housing steps of different diameters, within which, movable boundaries of a control pressure space and a modulation chamber are formed by diameter flanges of a modulator piston means corresponding to the two housing steps of different diameters;

wherein the modulation chamber is a smaller diameter chamber than the control pressure space and is connected to the main brake pipe of the static brake circuit between the connection control valve means and the brake pressure control valves means;

wherein there is a return spring urging the modulator piston means into an end position associated with a maximum volume of the modulation chamber;

wherein function control valve means are provided to alternatively connect the control pressure space of the pressure modulator to a pressure outlet of an auxiliary pressure source or to a non-pressurized sump container for displacing the modulator piston for controlling brake pressure changes;

a position indicator means for generating an electrical output signal, characteristic of the position of the modulator piston means;

an electronic control means generating the output signals necessary for correct triggering of the connection control valve means, the function control valve means and the brake pressure control valve means by processing the output signals of the position indicator and output signals of wheel rotational speed sensors, which generate electrical output signals characteristic of the dynamic behavior of the vehicle wheels;

wherein there is a mechanical controlled valve means connected between the outlet pressure space associated with the brake circuit of the driven vehicle wheels and the connection control valve means;

a valve chamber connected to the modulation chamber of the pressure modulator via an outlet nonreturn valve which can be driven into its open position by higher pressure in the modulation chamber relative to a pressure in the valve chamber;

said mechanically controlled valve is a displacement-controlled valve means having a valve body that is displaced in direction of a shut-off position for causing the outlet pressure space of the brake unit to be shut off relative to the valve chamber in response to displacement of the modulator piston means for reducing a volume of the modulation chamber from an intermediate position of the piston means corresponding to a volume of the modulation chamber of between 75% and 50% of its maximum volume;

said mechanically controlled valve being designed as a pressure-controlled valve which, at least when the modulator piston means is located in the intermediate position or in a position corresponding to a larger volume of the modulation chamber, can be driven into an open position by pressure in the outlet pressure space of the main brake unit, which pressure is higher than pressure in the valve chamber;

wherein upon an appearance of a locking tendency of the rear wheel brakes of the static brake circuit, the electronic control means generates output signals operating the antilocking control by displacing the modulator piston means into its intermediate position, subsequently switches the connection control valve means into its shut-off position, drives the brake pressure control valve means of a rear vehicle wheel brake not tending to lock into its shut-off position, and switches the function control valve means into a functional position causing pressure relief of the control pressure space;

wherein, upon the appearance of a spin tendency on one of the driven vehicle wheels, the electronic control means generates an output signals by which drive slip control operation is controlled, so that: the function control valve means is driven into a functional position causing connection of the control pressure space to the pressure outlet of the auxiliary pressure source, the connection control valve means is driven into a shut-off position, and the brake pressure control valve means of a vehicle wheel not tending to spin is also driven into its shut-off position; and wherein in normal braking not subject to a control system, the connection control valve means and the brake pressure control valves means are held in a through-flow position and the modulator piston means, monitored by means of the position indicator means, is held in a position which at least corresponds to the volume of the modulation chamber associated with its intermediate position.

2. Brake pressure setting device according to claim 1, wherein the modulator piston is held in the intermediate position provided both as an initial position for a pressure reduction phase of the antilocking control and as an initial position for a pressure build-up phase of the drive slip control, both in normal driving operation and also in the case of normal braking operation, not subject to an antilocking control.

3. Brake pressure setting device according to claim 2, wherein a difference in volumes of the ;modulation chamber and the pressure modulator, between their minimum ;and maximum values, corresponds to between 20% and 50% of a volume of that quantity of brake fluid which has to be forced into the brake circuit of the driven vehicle wheels in order to generate a maximum possible brake pressure in the rear wheel brakes, and wherein the modulator piston means, in the intermediate position used as the initial position for the antilocking control and the drive slip control, takes up a position from which a volume of the modulation chamber can be increased by at least 10% of a volume of brake fluid which is accepted by the static brake circuit when pressure is built up to a maximum value for which the brake installation is designed.

4. Brake pressure setting device according to claim 3, wherein the mechanically controlled valve means is designed as a seat valve with a valve body supported by means of a preloaded return spring, which can be compressed in an axial direction, and wherein an actuation element axially and displaceably penetrates through a hole in a housing wall separating the modulation chamber of the pressure modulator from the valve chamber in a pressure tight manner;

wherein relative motions of the valve body and the actuation element are limited by stops to a displacement corresponding to a stroke of the modulator piston from its initial position into an end position associated with minimum modulation chamber volume;

wherein that the actuation element arrives in axially supporting contact with the modulator piston means at the latest when the modulator piston means, has executed a small fraction of its stroke from its initial position for causing reductions to the modulation chamber volume;

and wherein a maximum opening stroke of the seat valve corresponds to only a small fraction of between 1/20 and 1/10 of a maximum possible stroke of the modulator piston means in the direction of decreasing volume of the modulation chamber.

5. Brake pressure setting device according to claim 4, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

6. Brake pressure setting device according to claim 3, wherein the mechanically controlled valve is designed as a ball/seat valve with a ball-ended valve body located on an outside bottom of a cylindrical pan-shaped retention sleeve and cooperatinq with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

7. Brake pressure setting device according to claim 2, wherein the mechanically controlled valve means is designed as a seat valve with a valve body supported by means of a preloaded return spring, which can be compressed in an axial direction, and wherein an actuation element axially and displaceably penetrates through a hole in a housing wall separating the modulation chamber of the pressure modulator from the valve chamber in a pressure tight manner;

wherein relative motions of the valve body and the actuation element are limited by stops to a displacement corresponding to a stroke of the modulator piston from its initial position into an end position associated with minimum modulation chamber volume;

wherein that the actuation element arrives in axially supporting contact with the modulator piston means at the latest when the modulator piston means, has executed a small fraction of its stroke from its initial position for causing reductions to the modulation chamber volume;

and wherein a maximum opening stroke of the seat valve corresponds to only a small fraction of between 1/20 and 1/10 of a maximum possible stroke of the modulator piston means in the direction of decreasing volume of the modulation chamber.

8. Brake pressure setting device according to claim 7, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

9. Brake pressure setting device according to claim 2, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

10. Brake pressure setting device according to claim 2, wherein the function control valve means includes a first 2/2-way solenoid valve and a second 2/2-way solenoid valve whose basic positions are their shut-off positions and whose actuated positions are their through-flow positions;

and wherein the first solenoid valve is connected between a control connection of the pressure modulator and the high pressure outlet of the auxiliary pressure source and the second solenoid valve is connected between the control connection of the pressure modulator and the non-pressurized sump container of the auxiliary pressure source.

11. Brake pressure setting device according to claim 1, wherein a difference in volumes of the modulation chamber and the pressure modulator, between their minimum and maximum values, corresponds to between 20% and 50% of a volume of that quantity of brake fluid which has to be forced into the brake circuit of the driven vehicle wheels in order to generate a maximum possible brake pressure in the rear wheel brakes, and wherein the modulator piston means, in the intermediate position used as the initial position for the antilocking control and the drive slip control, takes up a position from which a volume of the modulation chamber can be increased by at least 10% of a volume of brake fluid which is accepted by the static brake circuit when pressure is built up to a maximum value for which the brake installation is designed.

12. Brake pressure setting device according to claim 11, wherein the mechanically controlled valve means is designed as a seat valve with a valve body supported by means of a preloaded return spring, which can be compressed in an axial direction, and wherein an actuation element axially and displaceably penetrates through a hole in a housing wall separating the modulation chamber of the pressure modulator from the valve chamber in a pressure tight manner;

wherein relative motions of the valve body and the actuation element are limited by stops to a displacement corresponding to a stroke of the modulator piston from its initial position into an end position associated with minimum modulation chamber volume;

wherein that the actuation element arrives in axially supporting contact with the modulator piston means at the latest when the modulator piston means, has executed a small fraction of its stroke from its initial position for causing reductions to the modulation chamber volume;

and wherein a maximum opening stroke of the seat valve corresponds to only a small fraction of between 1/20 and 1/10 of a maximum possible stroke of the modulator piston means in the direction of decreasing volume of the modulation chamber.

13. Brake pressure setting device according to claim 12, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

14. Brake pressure setting device according to claim 11, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

15. Brake pressure setting device according to claim 11, wherein the function control valve means includes first 2/2-way solenoid valve and a second 2/2-way solenoid valve whose basic positions are their shut-off positions and whose actuated positions are their through-flow positions;

and wherein the first solenoid valve is connected between a control connection of the pressure modulator and the high pressure outlet of the auxiliary pressure source and the second solenoid valve is connected between the control connection of the pressure modulator and the non-pressurized sump container of the auxiliary pressure source.

16. Brake pressure setting device according to claim 1, wherein the mechanically controlled valve means is designed as a seat valve with a valve body supported by means of a preloaded return spring, which can be compressed in an axial direction, and wherein an actuation element axially and displaceably penetrates through a hole in a housing wall separating the modulation chamber of the pressure modulator from the valve chamber in a pressure tight manner;

wherein relative motions of the valve body and the actuation element are limited by stops to a displacement corresponding to a stroke of the modulator piston from its initial position into an end position associated with minimum modulation chamber volume;

wherein that the actuation element arrives in axially supporting control with the modulator piston means at the latest when the modulator piston means, has executed a small fraction of its stroke from its initial position for causing reductions to the modulation chamber volume;

and wherein a maximum opening stroke of the seat valve corresponds to only a small fraction of between 1/20 and 1/10 of a maximum possible stroke of the modulator piston means in the direction of decreasing volume of the modulation chamber.

17. Brake pressure setting device according to claim 16, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

18. Brake pressure setting device according to claim 16, wherein the function control valve means includes a first 2/2-way solenoid valve and a second 2/2-way solenoid valve whose basic positions are their shut-off positions and whose actuated positions are their through-flow positions;

and wherein the first solenoid valve is connected between a control connection of the pressure modulator and the high pressure outlet of the auxiliary pressure source and the second solenoid valve is connected between the control connection of the pressure modulator and the non-pressurized sump container of the auxiliary pressure source.

19. Brake pressure setting device according to claim 1, wherein the mechanically controlled valve is designed as a ball/seat valve with a ball-ended valve body located on an outside bottom of a cylindrical pan-shaped retention sleeve and cooperating with a conical valve seat designed as an opening on a valve chamber side of an inlet duct leading to the main brake unit; and wherein an end of the actuation element is located within the valve chamber and is designed as a radial flange with a side facing towards the valve body supporting the return spring and with a side facing towards the modulation chamber behind it, and wherein the actuating element has a contact flange pointing radially inwards of the sleeve on an outer edge region and which actuating element also carries the valve body.

20. Brake pressure setting device according to claim 1, wherein the function control valve means includes a first 2/2-way solenoid valve and a second 2/2-way solenoid valve whose basic positions are their shut-off positions and whose actuated positions are their through-flow positions;

and wherein the first solenoid valve is connected between a control connection of the pressure modulator and the high pressure outlet of the auxiliary pressure source and the second solenoid valve is connected between the control connection of the pressure modulator and the non-pressurized sump container of the auxiliary pressure source.

* * * * *